(12) United States Patent
Fay

(10) Patent No.: US 6,912,606 B2
(45) Date of Patent: Jun. 28, 2005

(54) GENERIC SERIAL BUS ARCHITECTURE

(75) Inventor: Victor Fay, Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 436 days.

(21) Appl. No.: 09/877,499

(22) Filed: Jun. 8, 2001

(65) Prior Publication Data

US 2002/0188782 A1 Dec. 12, 2002

(51) Int. Cl.$^7$ ............................................. G06F 13/38
(52) U.S. Cl. ........................ 710/64; 710/105; 710/110
(58) Field of Search ............................... 710/8, 15, 62, 710/63, 72, 104, 105, 110, 64; 709/220

(56) References Cited

U.S. PATENT DOCUMENTS

| | | | |
|---|---|---|---|
| 5,784,581 A | * | 7/1998 | Hannah ...................... 710/110 |
| 6,141,719 A | * | 10/2000 | Rafferty et al. ............. 710/316 |
| 6,370,603 B1 | * | 4/2002 | Silverman et al. ............ 710/72 |
| 6,460,094 B1 | * | 10/2002 | Hanson et al. ................. 710/8 |
| 6,549,966 B1 | * | 4/2003 | Dickens et al. ............. 710/300 |

OTHER PUBLICATIONS

Philips Semiconductors "The I²C–Bus Specification Version 2.1" Jan. 2000.
IEEE Computer Society "IEEE Standard Test Access Port and Boundary–Scan Architecture,"IEEE Std 1149.1–1990 (Includes IEEE Std 1149.1a–1993, Published by the Institute of Electircal and Electronics Engineers, Inc., 347 East 47$^{th}$ Street, New York, NY 10017, USA Oct. 21, 1993.

IEEE Computer Society "Supplement to IEEE Std 1149.1–1990, IEEE Standard Test Access Port and Boundary–Scan Architecture," IEEE Std 1149.1b–1994 Supplement to IEEE Std 1149.1–1990 and IEEE Std 1149.1a–1993, Published by the Institute of Electircal and Electronics Engineers, Inc., 347 East 47$^{th}$ Street, New York, NY 10017, USA Mar. 1, 1995.

TIA/EIA Standard "Interface Between Data Terminal Equipment and Data Circuit–Terminating Equipment Employing Serial Binary Data Interchange," Telecommunications Industry Association, Oct. 1997.

* cited by examiner

Primary Examiner—Khanh Dang
(74) Attorney, Agent, or Firm—Lahive & Cockfield, LLP

(57) ABSTRACT

A serial bus is provided that supports multiple data transmission protocols. The serial bus allows a bus master to communicate with a variety of semiconductor devices that support a variety of serial interface standards. As a result, a single bus master may control and observe a JTAG-compatible semiconductor device, an SPI-compatible semiconductor device and an I²C compatible semiconductor device over the serial bus.

27 Claims, 4 Drawing Sheets

GENERIC SERIAL BUS ARCHITECTURE

TECHNICAL FIELD OF THE INVENTION

The present invention generally relates to data transmission, and more particularly, to a serial bus that transmits data in multiple data transmission protocols.

BACKGROUND OF THE INVENTION

Several serial bus technologies and methodologies have been developed and incorporated into protocol standards to allow functional control, operation, configuration and test of semiconductor devices. Some of the more popular protocol standards include the Inter-IC ($I^2C$) bus specification developed by Phillips Semiconductors, the serial peripheral interface (SPI) standard developed by Motorola Inc., the Joint Test Access Group (JTAG) standard embodied as the 1149.1 IEEE standard, and recommended standard-232C (RS-232) approved by the Electronic Industries Association (EIA) for connecting serial devices. Nevertheless, implementation of semiconductor devices with protocol specific serial interfaces have proved burdensome in electronic applications that utilize a backplane assembly to transmit clock signals, data signals, and control lines to multiple circuit card assemblies connected to the backplane assembly. Moreover, because there are multiple serial interface standards, the electronic apparatus must incorporate multiple serial busses in the backplane assembly to support the various serial data transfer protocols.

Moreover, each serial interface standard identified includes its own unique limitations that further hinder implementation of mixed serial interface standards in an electronic apparatus having a backplane assembly. For example, JTAG enhanced semiconductor devices require an uninterruptable serial chain to couple each device in order to pass data from one device to another. Hence, when a JTAG serial bus is incorporated into a backplane assembly, removal of a circuit card assembly having JTAG enhanced semiconductor devices from the backplane assembly breaks the JTAG serial chain and leaves the remainder of the JTAG serial chain non-functional. Although JTAG enhancements targeting the backplane environment can be implemented, such as an addressable shadow port (ASP) or bus extenders with switchable bus isolation switches, the enhancements are burdensome to control and monitor.

With regard to $I^2C$ semiconductor devices, the $I^2C$ standard utilizes a limited addressability bus that allows no more than eight $I^2C$ semiconductor devices per bus. Thus, a backplane assembly must include multiple $I^2C$ buses to compensate for the limited addressability of the $I^2C$ standard.

With regard to the SPI semiconductor devices, the SPI standard requires an individual chip select for each SPI semiconductor device. As a result of the individual chip select requirement, SPI semiconductor devices are often unsuitable for direct connection with a remote master controller.

SUMMARY OF THE INVENTION

The present invention addresses the above-described limitations associated with an electronic system that employs multiple serial busses to support multiple serial bus protocols. The present invention provides an approach that utilizes a single serial bus to support multiple serial bus interface standards and data transfer protocols.

In one embodiment of the present invention, a bus that supports multiple data transmission protocols interconnects multiple semiconductor devices. To establish a communication channel, a bus master connected to the bus selects a desired semiconductor device to communicate with and a slave controller configures the bus to support the data transmission protocol required by the selected serial semiconductor device. For example, if the bus master selects a JTAG enhanced semiconductor device, the slave controller configures the bus to support the control and data lines required to communicate with the JTAG circuitry of the selected JTAG enhanced semiconductor device.

Coupling the selected serial semiconductor device to the bus is a slave controller that buffers all bus control and data lines. In addition the slave controller performs the functions of address decoding, transmission line configuration, device selection, and device resets. Moreover, the slave controller can be adapted to allow a circuit card assembly to support "hot-swap" removal and plug-in.

The above-described approach benefits an electronic system that utilizes semiconductor devices from across the various serial interface technology families. As a result, a single serial bus can be implemented into a backplane assembly to provide a communication channel between a master control card and a variety of semiconductor devices with a serial interface that are mounted to multiple circuit card assemblies connected to the backplane assembly. The bus of the present invention is able to support a backplane assembly containing up to 128 circuit card assemblies with each circuit card assembly containing up to 128 semiconductor devices.

In accordance with another aspect of the present invention, a method is performed that allows a bus master to communicate with multiple semiconductor devices in multiple data transmission protocols over a single bus. To initiate communications on the bus, the bus master first selects a semiconductor device having a serial interface by addressing the selected circuit card assembly and the serial semiconductor device mounted thereto. Upon decoding the address of a serial semiconductor device, the slave controller asserts an acknowledgement back to the bus master and configures the bus to support the data transmission protocol of the selected serial interface semiconductor device.

The above-described approach benefits an electronic assembly that has a need to remotely control multiple semiconductor devices having a serial interface located on multiple circuit card assemblies from one central location using multiple data transmission protocols on a single bus. As a result, the electronic assembly can perform run-time monitoring, and control of various system parameters, and perform system debug and test from one central location without the need for external supporting equipment.

In accordance with yet another aspect of the present invention, a printed circuit board assembly is provided that contains multiple sockets adapted to receive another circuit card assembly. The printed circuit board assembly includes a configurable bus connected to each of the sockets. A master circuit card assembly is connected to one of the sockets to communicate with a desired semiconductor device mounted to a circuit card assembly connected to another socket. To select the desired serial semiconductor device, the master circuit card assembly asserts on the configurable bus, an address corresponding to the circuit card assembly and the desired semiconductor device mounted thereto. Mounted to the circuit card assembly containing the desired semiconductor device is a slave controller whose function is to decode the address asserted by the master circuit card assembly and to configure data and control lines in accordance with the serial protocol of the desired serial semiconductor device.

In another aspect of the present invention, an electronic apparatus is adapted to house one or more circuit card assemblies and utilizes a single bus to provide control and observation for multiple semiconductor devices mounted to one or more circuit card assemblies. The electronic apparatus includes a backplane assembly that allows the single bus to interconnect with multiple circuit card assemblies. A master circuit card assembly is utilized by the electronic apparatus to control and a slave controller is utilized to configure the single bus. As a result, the single bus is compatible with the various data transmission protocols of the various serial transmission technology standards.

BRIEF DESCRIPTION OF THE DRAWINGS

An illustrative embodiment of the present invention will be described below relative to the following drawings.

DETAILED DESCRIPTION

The illustrative embodiment of the present invention provides a bus that allows a bus master to communicate over the bus with multiple semiconductor devices having a serial interface that utilize multiple data transmission and interface protocols. In the illustrative embodiment, the bus master asserts the address of a targeted semiconductor device over the bus to initiate communications with the targeted device. A slave controller mounted to the circuit card assembly containing the targeted semiconductor device, couples the circuit card assembly to the bus and performs the decode of the address asserted by the bus master. To acknowledge selection of the targeted semiconductor device the slave controller returns an acknowledgement (Ack) over the bus to the bus master to confirm selection of the desired semiconductor device. Upon decoding of the address, the slave controller configures the bus to meet the data transfer protocol requirements of the selected serial interface semiconductor device. Once the bus is properly configured, the bus master and the selected semiconductor device communicate with each other over the bus in the serial data transmission protocol of the selected semiconductor device.

In the illustrative embodiment, the bus architecture defines how a semiconductor device having a serial interface is selected, but does not impose a specific data transmission protocol. Thus, the bus architecture of the present invention is compatible with the multiple data transmission protocols of the multiple serial transmission technology standards.

The bus architecture of the present invention provides configurable control lines and data lines that can be configured to perform a variety of control and data functions. The control lines and data lines of the bus are configured based on the transmission data protocol and the interface protocol of the selected serial interface semiconductor device. In this manner, the bus is adaptable to include as many control lines and data lines needed to support the data transmission protocol of the selected semiconductor device without changing the nature of the bus operation. The illustrative embodiment of the present invention is attractive for use in an electronic apparatus that utilizes a backplane assembly to interconnect multiple circuit card assemblies, such as an optical switch or an electrical switch or other electronic assemblies. In this manner, a central controller may be utilized to monitor and control all circuit card assemblies connected to the backplane assembly. The bus of the illustrative embodiment can be adapted to support "hot-swap" capabilities and employs a series resistor and a Schmidt Trigger at each receiver to avoid signal integrity issues, such as ringing.

Figure 1:
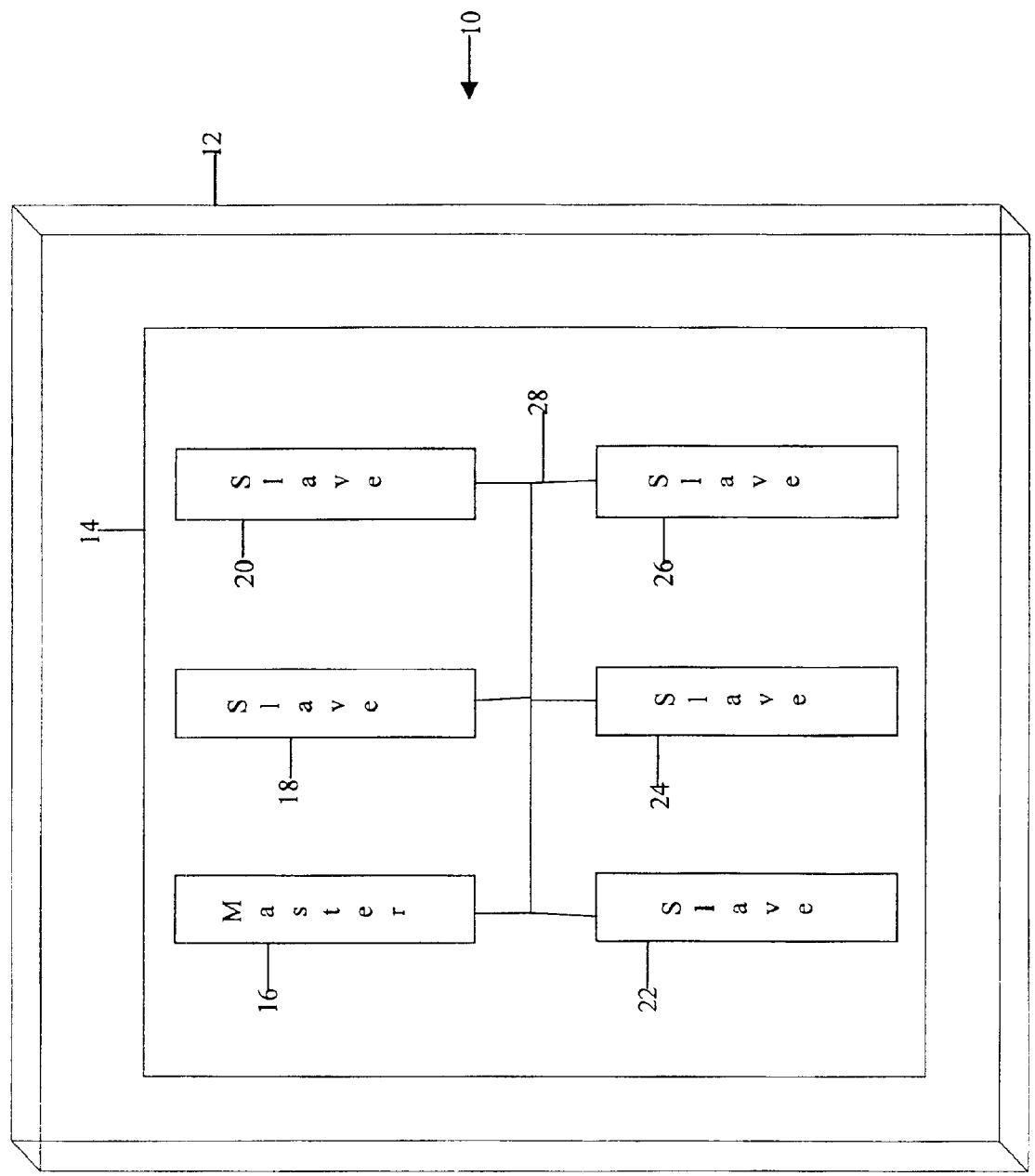
FIG. 1 depicts an electrical apparatus suitable for practicing the illustrative embodiment of the present invention.

FIG. 1 illustrates an exemplary electronic apparatus 10 that is suitable for practicing the illustrative embodiment of the present invention. The exemplary electronic apparatus 10 includes a housing 12 that houses and protects the backplane assembly 14. The backplane assembly 14 includes a number of sockets or connectors adapted to receive a circuit card assembly. The sockets that are illustrated include the master socket 16, the slave socket 18, the slave socket 20, the slave socket 22, the slave socket 24, and the slave socket 26. Interconnecting each of these sockets is the configurable serial bus 28. The circuit card assembly installed into the master socket 16 is the bus master circuit card assembly that operates to control the configurable serial bus 28.

The configurable serial bus 28 generally operates in two phases, the first phase being the addressing phase and the second phase being the data transmission phase. The purpose of the addressing phase is to select a serial interface semiconductor device and to configure the configurable serial bus 28 according to the serial transmission protocol of the selected serial interface semiconductor device. The purpose of the second phase is to transfer data to and from the bus master circuit card assembly and the selected semiconductor device to communicate with the selected semiconductor device.

One skilled in the art will recognize that any of the sockets depicted in the backplane assembly 14 are illustrative and that the arrangement of the master socket for coupling the master circuit card assembly to the configurable serial bus 28 relative to the slave socket can be arranged into other desirable configurations. Moreover, those skilled in the art will recognize that the backplane assembly 14 is illustrated with six card sockets but may include as few as two (2) circuit card sockets and up to one hundred twenty-eight (128) circuit card sockets.

As illustrated, the master circuit card assembly inserted into the master socket 16 can remotely control multiple serial interface semiconductor devices utilizing multiple serial interface and protocols technologies, such as JTAG, I²C, SPI, RS232, Microwire, or the like, by addressing the desired semiconductor device and configuring the configurable serial bus 28 to support the appropriate data transmission protocol.

The configurable serial bus 28 advantageously benefits an electronic apparatus utilized within an electronics assembly. As a result of the configurable serial path 28, a circuit card assembly can be removed from the backplane assembly 14 without affecting other circuit card assemblies. Consequently, each serial interface semiconductor device mounted to the remaining circuit card assemblies can be directly addressed by the master circuit card. The addressing operation of the configurable serial bus 28 and configuration of the control lines and data lines utilized by the configurable serial bus 28 will be discussed below in more detail.

Figure 2:
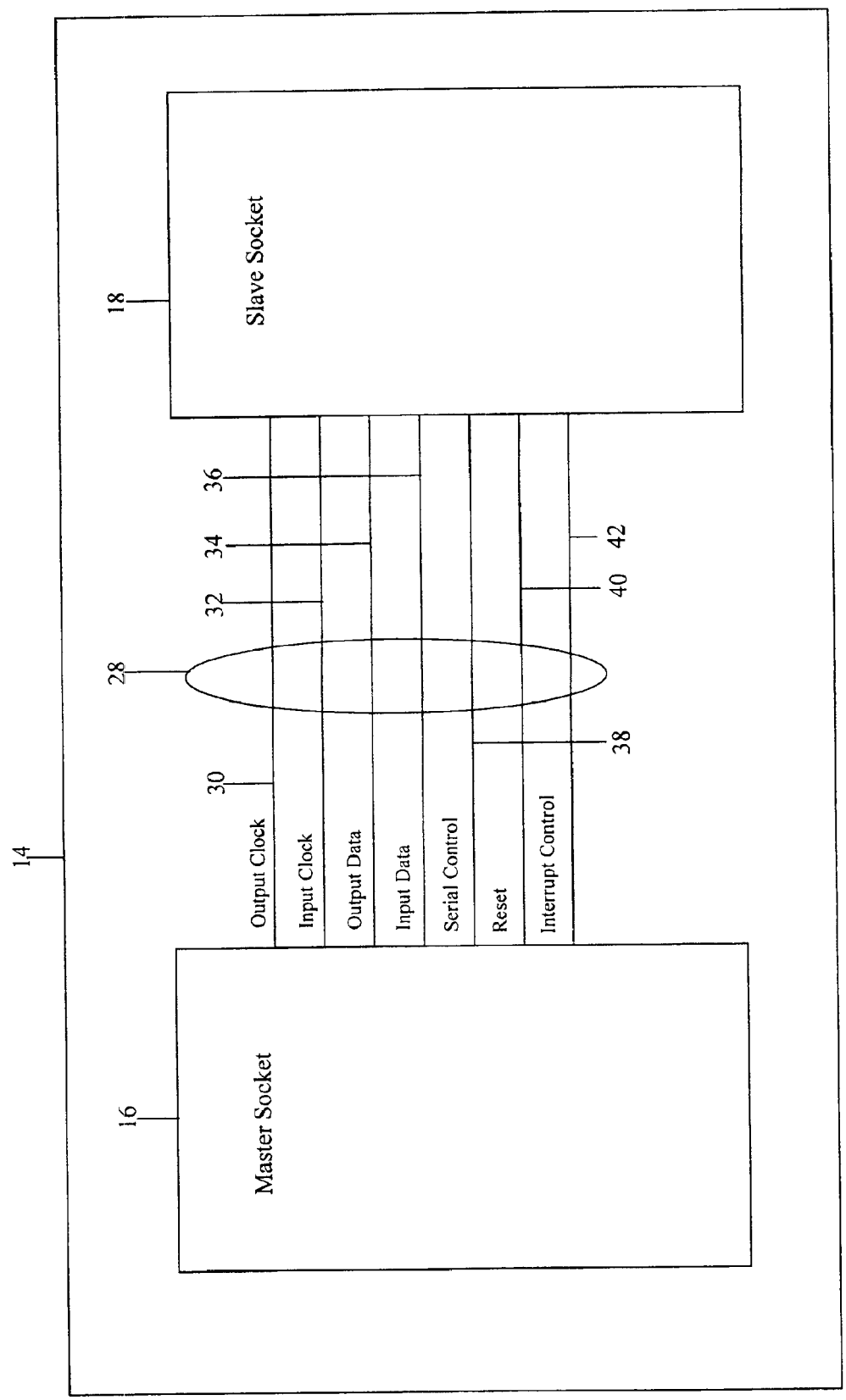
FIG. 2 depicts a bus of FIG. 1 in more detail.

FIG. 2 illustrates the configurable serial bus 28 in more detail. As illustrated, the backplane assembly 14 is adapted to include a socket adapted to host the bus master and one or more other sockets adapted to host one or more circuit card assemblies that act as a slave to the bus master. As shown in FIG. 2, the master socket 16 is adapted to host the bus master and the slave socket 18 is adapted to host a slave circuit card assembly. The master/slave relationship between the bus master and slave circuit card assemblies will be described in more detail below. One skilled in the art will recognize that the "socket" discussed herein is a physical component, such as a connector or a receptacle into which a circuit card assembly can be inserted, and not a software object.

The example configurable serial bus 28 shown in FIG. 2 is adapted to include at least seven shared control and data lines. Those skilled in the art will also appreciate that the configurable serial bus 28 may be adapted to include more than seven shared control and data lines to support additional control functions or features of the various serial interface technology specifications.

The shared control and data lines illustrated in FIG. 2 include the output clock line 30 and the output data line 34 that are driven by the bus master connected to the master socket 16. Other shared control lines include the input clock line 32 and the input data line 36 that are driven by a slave circuit card assembly installed into the slave socket 18. In addition, the bus master drives the phase control line 38 to control when the configurable serial bus 28 is addressing a selected semiconductor device and when the configurable serial bus 28 is transmitting data to and from the selected semiconductor device. The bus master utilizes the reset control line 40 to issue a reset to a selected slave device. Finally, the interrupt control line 42 is driven by a slave circuit card assembly to assert an interrupt signal to the bus master, or acknowledge device selection.

Upon power-up of the backplane assembly 14, the shared control and data lines, are not driven and are resistively pulled up to a logic "one" level. In operation, the bus master connected to the master socket 16 drives all output control and data lines, such as the output clock line 30 and the output data line 34. Likewise, the selected slave circuit card assembly connected to the slave socket 18 drives all input control and data lines, namely the input clock line 32 and the input data line 36.

To address a desired semiconductor device having a serial interface and establish a communication channel, the bus master asserts the address of the desired semiconductor device on the configurable serial bus 28 to initiate serial communication with the selected semiconductor device. The addressing scheme of the configurable serial bus 28 will be discussed in more detail below. The address asserted by the bus master on the output data line 34 is shifted into the address register of each slave circuit card assembly connected to the backplane assembly 14 on the positive transition of the clock signal asserted on the output clock line 30. A slave controller 50 connected to each circuit card assembly decodes the asserted address. The circuit card assembly containing the selected semiconductor device returns an Ack to the bus master to acknowledge selection of the semiconductor device. Upon decoding the address, the slave controller 50 configures the configurable serial bus 28 to support the data transmission protocol of the selected semiconductor device to establish a communication channel.

The configuration of the configurable serial bus 28 and the transfer of data between the bus master and the selected semiconductor device will be discussed below in more detail. Those skilled in the art will appreciate that the clock signal asserted by the bus master on the output clock line 30 is programmable clock signal and the clock signal may be asserted by the bus master with a positive polarity, or with a negative polarity.

The functions provided by the shared control and data lines of the configurable serial bus 28 are herein described. Those skilled in the art will recognize that some of the signals described below may be optional signals depending on the application. The input clock line 32 is an input clock line driven by a selected slave circuit card assembly. The input clock line 32 passes a clock signal, or may pass a general purpose data signal to the bus master for the selected slave circuit card assembly.

The output data line 34 is an output data line driven by the bus master. The bus master utilizes the output data line 34 to first assert the address of the selected semiconductor device and the slave circuit card assembly mounted thereto. In the data transfer phase, the output data line 34 is used by the bus master to transmit data to the selected semiconductor device.

The input data line 36 is an input data line driven by a selected slave circuit card assembly. The slave circuit card assembly utilizes the input data line 36 to pass data to the bus master.

The phase line 38 controls the phase of communication between the bus master and the selected semiconductor device mounted to a slave circuit card assembly. When the bus master is addressing the selected semiconductor device, the bus control line 38 is driven or pulled to a logic "one" level and when the bus master and the selected semiconductor device are exchanging data, the bus control line 38 is driven or pulled to a logic "zero" level. In addition, the bus control line 38 can be driven from a logic "zero" level to a logic "one" level and back to a logic "zero" level while the bus master and the selected semiconductor device are exchanging data so long as the clock signal on the output clock line 30 does not transition while the bus control line 38 is driven to the logic "one" level. The ability to drive the bus control line 38 from a logic "zero" level to a logic "one" level and back to a logic "zero" enables the bus master and the selected semiconductor device to perform multiple data exchanges without the need for the bus master to readdress the selected semiconductor device.

The reset control line 40 is utilized by the bus master to reset a selected slave circuit card assembly or utilized by the bus master to provide a general purpose input control line to a selected semiconductor device. Typically, the bus master is able to assert three different resets on the reset control line 40. The first reset, known as the address reset, is used by the bus master to reset the address shift registers of all slave circuit card assemblies to "zero". The second reset, known as the slot reset, is used by the bus master to reset all serial interface semiconductor devices mounted to the selected slave circuit card assembly. The third type of reset, known as the device reset, is used by the bus master to reset a selected semiconductor device.

The interrupt control line 42 is a shared interrupt line shared by all slave circuit card assemblies connected to the backplane assembly 14. When the configurable serial bus 28 is in the address phase, the interrupt control line 42 is typically masked or ignored. When the configurable serial bus 28 is in the data transfer phase, the interrupt control line 42 is used by the selected semiconductor device to acknowledge selection by the bus master. When the configurable serial bus 28 is not being utilized to address a selected semiconductor device, or utilized to transfer data from the selected semiconductor device to the bus master, a slave circuit card assembly can assert the interrupt control line 42 to indicate an interrupt condition and the bus master in response polls all the slave circuit card assemblies connected to the backplane assembly 14 to establish the source of the interrupt line and the cause for the interrupt.

Figure 3:
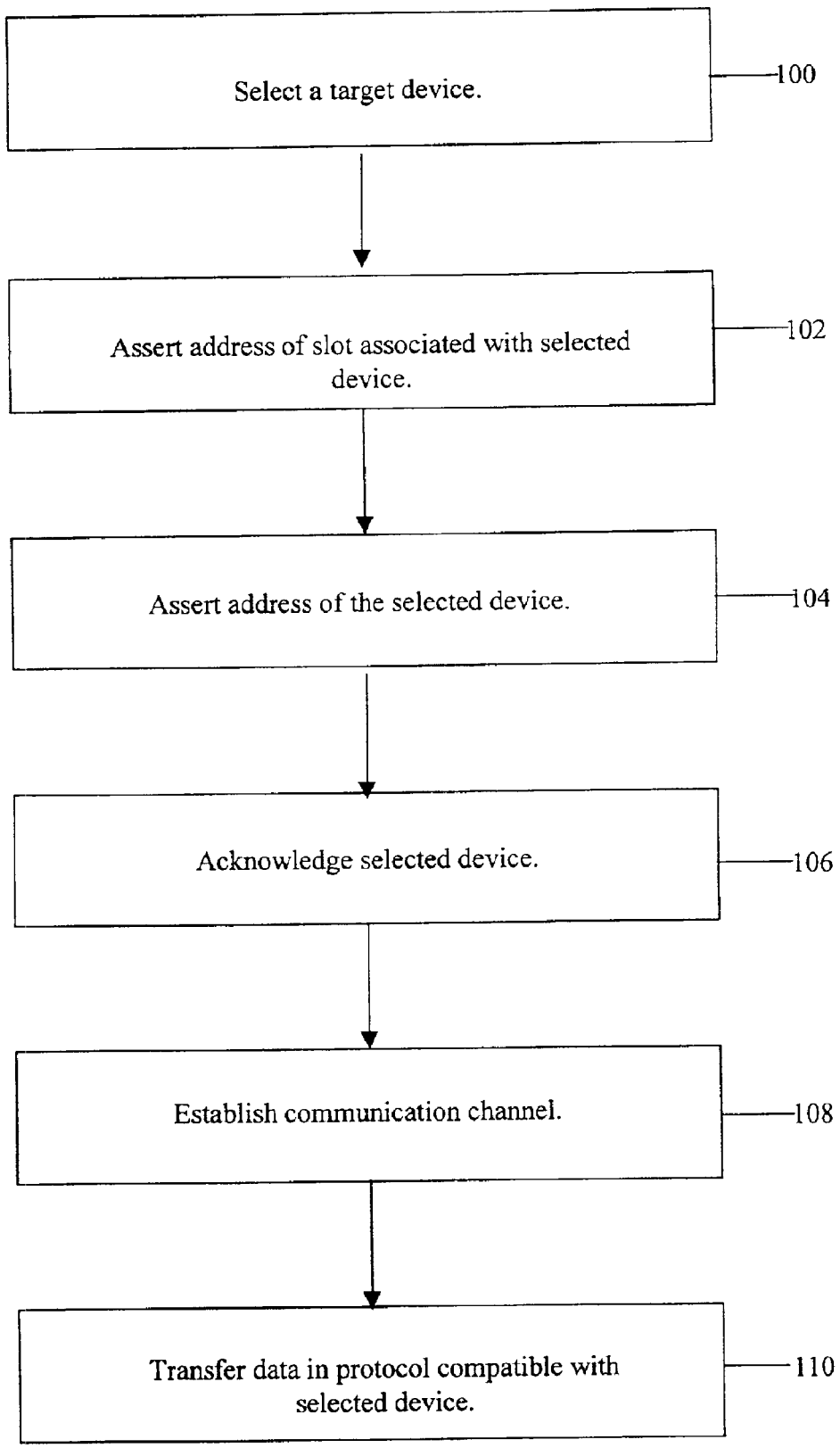
FIG. 3 is a flow diagram depicting the steps taken to control and configure the bus of the illustrative embodiment.

With reference to FIG. 3, the bus master of the configurable serial bus 28 is the circuit card assembly responsible for selecting a serial semiconductor device while the slave controller is responsible for configuring the configurable serial bus 28 to support the data transmission protocol of the selected semiconductor device. The configurable serial bus 28 is a two phase serial bus. The first phase corresponds to the selection or addressing of the targeted semiconductor device and the second phase corresponds to the transfer of data between the bus master and the targeted semiconductor device in the data transmission protocol defined by the targeted semiconductor device.

The first phase of the configurable serial bus 28, the address phase, is the same for all communications and all types of semiconductor devices having a serial interface. When the configurable serial bus 28 is in the address phase, the bus master utilizes a 16-bit address to select a semiconductor device mounted to a slave circuit card assembly (step 100 in FIG. 3). The 16-bit address includes an 8-bit socket address and an 8-bit semiconductor device address. The bus master using the output clock line 30 and the output data line 34 shifts the 16-bit address into the address registers of each circuit card assembly connected to the backplane assembly 14 while the phase control line 38 is driven to a logic "one" level. The addressing scheme is such that the bus master first asserts the socket address starting with the most significant bit (step 102 in FIG. 3) and then asserts the address of the selected semiconductor device starting with the most significant bit of the semiconductor device (step 104 in FIG. 3).

Those skilled in the art will appreciate that the bus master can assert the 16-bit address with or without the use of parity bits. Moreover, socket addresses corresponding to particular sockets on the backplane assembly 14 may be reserved for special functions, or withheld from use altogether. For example, a socket address may be reserved for the backplane assembly 14 and a socket address may be reserved for use as a broadcast feature.

The configurable serial bus 28 enters its second phase, the data transfer phase, when the bus master drives the phase control line 38 to a logic "zero" level. If the address asserted by the bus master is received successfully by the slave controller 50 of the slave circuit card assembly containing the selected serial interface semiconductor device, that is, with no parity errors if parity is selected, the slave controller 50 of the selected slave circuit card assembly acknowledges selection by driving the interrupt control line 42 to a logic "zero" level (step 106 in FIG. 3). While the selected slave circuit card assembly is driving the interrupt control line 42 to a logic "zero" level, the slave controller 50 of the selected slave circuit card assembly configures the input clock line 32 and the input data line 36 along with the output clock line 30, the output data line 34 and the reset line 40 in accordance with the data transmission protocol of the selected semiconductor device (step 108 in FIG. 3).

The configuration of the shared control lines by the selected slave circuit card assembly establishes a communication channel between the bus master and the selected serial interface semiconductor device, or in the case of multicasting the selected serial interface semiconductor devices. When the communication channel is established, the bus master utilizes the appropriate data transmission protocol to communicate with the selected semiconductor device.

The slave controller 50 determines the appropriate data transmission protocol upon the successful decoding of the address asserted by the bus master for the selected serial interface semiconductor device. Hence, every serial interface semiconductor device address is matched or assigned to an appropriate data transmission protocol. The correlation between an address of a serial interface semiconductor device and the appropriate transmission data protocol is programmed into a slave controller 50. Those skilled in the art will appreciate that the slave controller 50 may also dynamically select the appropriate data transmission protocol by polling the selected serial interface semiconductor device for transmission protocol information or perform a lookup operation in a data structure to obtain the appropriate data transmission protocol for the selected device.

Consequently, the slave controller 50 utilizes the output clock line 30, the input clock line 32, the output data line 34, the input data line 36, and the reset line 40 according to the type of serial interface technology supported by the selected semiconductor device (step 110 in FIG. 3). When the data transfer is complete, the bus master drives the phase control line 38 to a logic "one" level and the selected slave circuit card assembly de-asserts the interrupt control line 42 and turns off its output drivers. At this point, the configurable serial bus 28 is able to return to the addressing phase to select another serial interface semiconductor device.

The configurable serial bus 28 allows the use of repetitive data phases following a single address phase to support multiple data transfers. To utilize the benefit of repetitive data transfer phases, the bus master drives the bus control line 38 to a logic "zero" level without reasserting the address of the selected slave circuit card assembly and the selected semiconductor device. In response, the content of the address registers of the slave circuit card assemblies are not cleared or shifted, but remain intact until a new address phase is executed by the bus master, or the bus master issues a global reset. With multiple data transfer phases, the bus master can continuously exercise the selected semiconductor device to ensure consistent repetitive output data from the selected semiconductor device. In this manner, a semiconductor device suspected of having an intermittent functional error may be selected and exercised in a repetitive manner to help determine and evaluate the intermittent problem.

Figure 4:
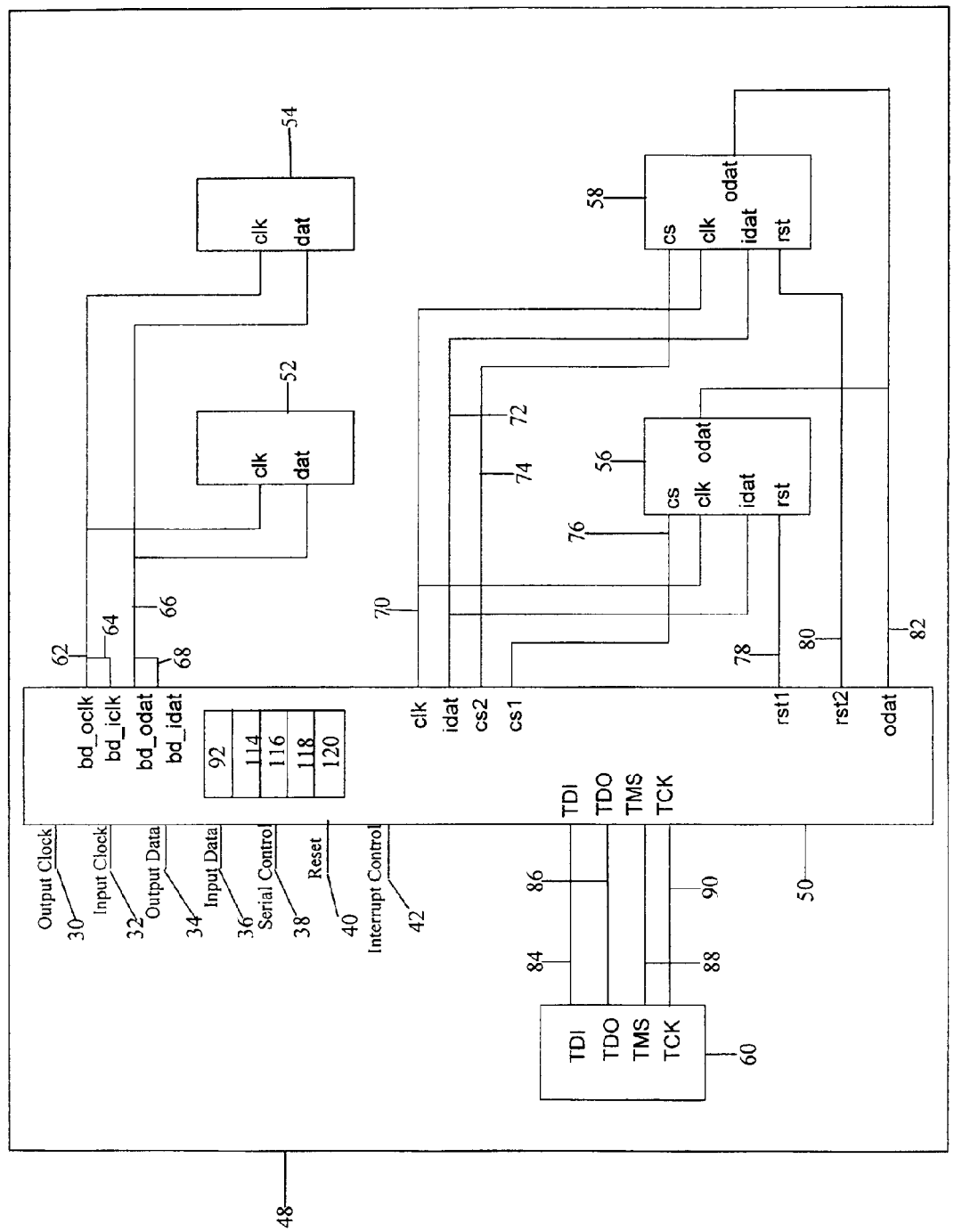
FIG. 4 is a block diagram that depicts the slave controller and several serial devices of the illustrative embodiment.

FIG. 4 illustrates the slave controller 50 of an exemplary slave circuit card assembly 48 in more detail. As illustrated, the slave controller 50 contains the buffers and drivers that buffer and drive the respective control lines and data lines of the configurable serial data bus 28. Additionally, the slave controller 50 performs the functions of address decoding, configuration of signals to and from the selected semiconductor device over the configurable serial bus 28, along with selection and reset of one or more of the semiconductor devices mounted to the exemplary slave circuit card assembly 48 as directed by the bus master. The slave controller 50 also contains a number of registers to facilitate addressing, configuration, diagnostics, and control of the configurable serial bus 28.

The exemplary slave controller 50 depicted in FIG. 4 includes the socket ID register 92. The socket ID register 92 contains the socket ID of the exemplary slave printed circuit board assembly 48. The socket ID register 92 is read by the bus master to verify the unique address of the slave circuit card assembly connected to the socket.

The slave controller 50 can include an EEPROM interface register 114 that allows the bus master to set up a bi-directional I²C channel to an EEPROM mounted to the selected circuit card assembly. In this fashion, the bus master utilizes the output clock line 30 and the input clock line 32 to control and monitor the bi-directional serial clock line of the EEPROM. The bus master also utilizes the output data line 34 and the input data line 36 to bi-directional serial data line of the EEPROM.

The slave controller 50 may include a status register 116. The status register 116 can be read by the bus master to determine the current status of the circuit card assembly. The slave controller 50 can also include the control register 118 that allows the bus master to control miscellaneous functions of the circuit board assembly. In addition, the slave controller 50 can include the interrupt enable register 120 that can be used to selectively enable various interrupt sources. Those skilled in the art will appreciate that the slave controller 50 may be a Field Programmable Gate Array (FPGA) or a Complex Programmable Logic Device (CPLD).

As illustrated in FIG. 4, the exemplary circuit card assembly 48 includes a variety of serial interface semiconductor devices mounted thereto. For example, the I²C serial device 52 and the I²C serial device 54 are connected to the slave controller 50 to allow the bus master to perform remote control and observation. In operation, when the bus master addresses either the I²C serial device 52 or the I²C serial device 54, the slave controller 50 configures the output clock line 30 and input clock line 32 to emulate the bi-directional clock line 62 as defined by the I²C standard. The slave controller 50 also configures the output data line 34 and input data line 36 to emulate the bi-directional data line 66 as defined by the I²C standard. With regard to the I²C standards referenced above, we hereby incorporate by reference the I²C Bus Specification, Version 2.1, published in January 2000 by Phillips Semiconductors.

In like manner, the slave controller 50 allows the bus master to interface with semiconductor devices that support the serial peripheral interface (SPI) standard, such as the SPI semiconductor device 56 and the SPI semiconductor device 58. When the bus master addresses a SPI serial device, the slave controller 50 configures the output clock line 30 to support input clock line 70 as defined by the SPI standard. Likewise, the slave controller 50 configures the output data line 34 to support of the input data line 72 as defined by the SPI standard, and configures the input data control line 36 to support the output data line 34 as defined by the SPI standard. Since SPI semiconductor devices have individual chip selects and reset inputs that are generated by the slave controller 50. The JTAG-enhanced semiconductor device 60 illustrates the mapping of the control and data signals in the configurable serial bus 28 to the control and data signals utilized to perform boundary scan on the JTAG-enhanced semiconductor device 60. The slave controller 50 couples the test clock control (TCK) line 90 to the output clock line 30, the test mode select (TMS) control line 88 to the reset control line 40, the test data output (TDO) data line 86 to the input data line 36 and the test data input (TDI) data line 84 to the output data line 36. In this manner, the bus master is able to perform JTAG boundary scan testing on the JTAG-enhanced semiconductor device 60. For further details concerning the JTAG standard, we hereby incorporate by reference the Institute of Electrical and Electronics Engineers (IEEE) 1149.1 standard entitled Standard Test Access Port and Boundary Scan Architecture.

While the present invention has been described with reference to a preferred embodiment thereof, one skilled in the art will appreciate that various changes in form and detail may be made without departing from the intended scope of the present invention as defined in the pending claims. For example, each electronic apparatus may have two configurable serial buses, namely, a primary and a secondary for redundancy purposes. Moreover, the configurable serial bus 28 can be implemented in a number of ways. For instance, the configurable serial bus 28 can be shared between all sockets in the backplane assembly, or the configurable serial bus 28 can be broken into multiple physical busses or traces with each bus or trace connected to a single socket or a group of sockets in the backplane assembly.

What is claimed is:

1. A data transmission system, comprising:
    a bus to interconnect a plurality of devices to inflow data transmission over said bus in a plurality of data transmissions protocols and a plurality of bus interface standards;
    one or more shared signals to select and control one of said plurality of devices;
    a bus master connected to said bus to control selection of one of said plurality of devices; and
    a slave controller connected to said bus and to said selected device to configure said bus for compatibility with a bus interface standard supported by said selected device to transport data on said bus in said one of said plurality of data transmission protocols compatible with said selected device.

2. The bus of claim 1, wherein said device comprises a semiconductor device.

3. The bus of claim 1, wherein said device comprises a unit of electronic hardware.

4. The bus of claim 1, wherein said plurality of data transmission protocols comprises in serial transmission protocol.

5. The bus of claim 4, wherein said serial transmission protocol comprises one of, Joint Test Access Group (JTAG), and inter-IC (I²C), and serial peripheral interface (SPI), and RS-232 protocols.

6. The bus of claim 1, wherein said slave controller is addressable by said bus master, whereby said bus master asserts an address on said bus to select said one of said plurality of devices and said slave controller decodes said asserted address to determine if said connected device is said selected device.

7. The bus of claim 6, wherein said address of said address of said addressable device includes a first portion and a second portion, whereby said first portion and said second portion combine to select said one of said plurality of devices.

8. The bus of claim 6, wherein said slave controller decodes said address asserted by said bus master to determine if said bus master selected said device connected to said slave controller for said data transmission.

9. The bus of claim 1, wherein the bus interconnects a plurality of devices in a unit of telecommunication hardware.

10. The bus of claim 9, wherein said telecommunications hardware comprises an optical switch.

11. A method for communicating with a plurality of electronic devices connected to a bus supporting communications in a plurality of bus interface standards to transmit data in plurality of data transmission protocols, said method comprising the steps of:
    selecting one of said plurality of devices connected to said bus; and configuring said bus in one of amid plurality of data transmission protocols compatible with a bus interface standard supported by said selected device.

12. The method of claim 11, wherein selection of said one of said plurality devices is addressed based.

13. The method of claim 11, wherein said selection of one of said plurality of devices is performed by a controller connected to said bus.

14. The method of claim 13, wherein said controller asserts an address corresponding to one of said plurality of devices to select said one of said plurality of devices.

15. The method of claim 14, wherein a slave controller connected to said bus and to said one of said plurality of devices, decodes said address asserted by said controller to determine if said connected device is said one of said plurality of devices selected by said controller.

16. The method of claim 15, wherein said slave controller configures said bus in said data transmission protocol compatible with said data transmission protocol of said selected devices.

17. A printed circuit board comprising:
a plurality of sockets receiving a plurality of circuit card assemblies;
a bus configurable to support a plurality of bus interface standards to transmit data in a plurality of data transmission protocols, wherein at least one of said plurality of data transmission protocols is compatible with a bus interface standard supported by a selected circuit card assembly of the plurality of circuit card assemblies connected to said plurality of sockets; and
a master circuit card assembly connected to a first socket of said plurality of sockets and selecting device mounted to one of said plurality of circuit card assemblies connected to a second socket of said plurality of sockets.

18. The printed circuit board of claim 17, wherein said master circuit card assembly comprises a bus master.

19. The printed circuit board of claim 17, wherein said master circuit card assembly asserts a logical address on said configurable bus to select said device mounted to said one of said plurality of circuit card assemblies connected to said second socket.

20. The printed circuit board of claim 17, wherein said configurable bus comprises a serial bus.

21. The printed circuit board of claim 17, wherein each of said plurality of circuit card assemblies comprises a controller to interface with the master circuit card assembly and configure said configurable bus to support a data transmission protocol compatible with said selected device.

22. An electronic apparatus housing one or more circuit card assemblies with each of said one or more circuit card assemblies having mounted thereto one or more semiconductor devices having a serial interface and an slave controller, said electronic apparatus comprising:
a backplane assembly on which is mounted a plurality of sockets to receive said one or more circuit card assemblies and a bus coupling each of said plurality of sockets, said bus being configurable to support a plurality of bus interface standards to transmit data in a plurality of data transmission protocols, wherein at least one of said plurality of transmission protocols is compatible with a bus interface standard supported by a selected circuit card assembly of one or more circuit card assemblies; and
a master circuit card assembly mated to one of said plurality of sockets to control data transmission in said plurality of data transmission protocols on said bus.

23. The electronic apparatus of claim 22, wherein said master circuit card assembly asserts a logical address on said bus to select a said semiconductor device mounted to said circuit card assembly, wherein said logical address asserted corresponds to a socket location and said selected semiconductor device mounted to said circuit card assembly.

24. The electronic apparatus of claim 22, wherein said slave controller connected to said bus decodes said logical address asserted by said master circuit card assembly to determine if said logical address asserted by said master device corresponds to said selected semiconductor device mounted to said circuit card assembly.

25. The electronic apparatus of claim 23, wherein said slave controller configures said bus to support one of said plurality of data transmission protocols compatible with said selected semiconductor device mounted to said selected circuit card assembly.

26. The electronic apparatus of claim 22, wherein said electronic apparatus comprises a unit telecommunication equipment.

27. The electronic apparatus of claim 26, wherein said unit of telecommunication equipment comprises an optical switch.

* * * * *